United States Patent
de Rege Thesauro et al.

(10) Patent No.: US 8,101,093 B2
(45) Date of Patent: Jan. 24, 2012

(54) CHEMICAL-MECHANICAL POLISHING COMPOSITION AND METHOD FOR USING THE SAME

(75) Inventors: Francesco de Rege Thesauro, Naperville, IL (US); Kevin J. Moeggenborg, Naperville, IL (US); Vlasta Brusic, Geneva, IL (US); Benjamin P. Bayer, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 375 days.

(21) Appl. No.: 12/393,489

(22) Filed: Feb. 26, 2009

(65) Prior Publication Data

US 2009/0152240 A1 Jun. 18, 2009

Related U.S. Application Data

(62) Division of application No. 10/807,944, filed on Mar. 24, 2004, now abandoned.

(51) Int. Cl.
*C03C 15/00* (2006.01)
(52) U.S. Cl. .......................................... 216/89; 252/79.1
(58) Field of Classification Search ........................ None
See application file for complete search history.

(56) References Cited

U.S. PATENT DOCUMENTS

| | | | |
|---|---|---|---|
| 4,929,257 A | 5/1990 | Miyazaki et al. | |
| 4,959,113 A | 9/1990 | Roberts | |
| 5,693,239 A * | 12/1997 | Wang et al. | 216/88 |
| 6,099,604 A * | 8/2000 | Sandhu et al. | 51/307 |
| 6,110,396 A | 8/2000 | Ronay | |
| 6,379,406 B1 * | 4/2002 | Thomas et al. | 51/309 |
| 6,432,828 B2 * | 8/2002 | Kaufman et al. | 438/693 |
| 6,432,848 B2 | 8/2002 | Akane et al. | |
| 6,468,913 B1 | 10/2002 | Pasqualoni et al. | |
| 6,607,424 B1 | 8/2003 | Costas et al. | |
| 6,649,523 B2 | 11/2003 | Basol et al. | |
| 6,679,929 B2 | 1/2004 | Asano et al. | |
| 6,686,022 B2 | 2/2004 | Takano et al. | |
| 6,812,193 B2 * | 11/2004 | Brigham et al. | 510/175 |
| 6,821,187 B2 * | 11/2004 | Beitel et al. | 451/5 |
| 7,014,669 B2 | 3/2006 | Small et al. | |
| 2001/0006224 A1 | 7/2001 | Tsuchiya et al. | |
| 2002/0039839 A1 | 4/2002 | Thomas et al. | |
| 2002/0068456 A1 | 6/2002 | Basol et al. | |
| 2002/0122339 A1 | 9/2002 | Takano et al. | |
| 2002/0139055 A1 | 10/2002 | Asano et al. | |
| 2003/0006396 A1 | 1/2003 | Wang et al. | |
| 2003/0077221 A1 | 4/2003 | Chiruvolu et al. | |
| 2003/0162398 A1 | 8/2003 | Small et al. | |
| 2004/0029494 A1 | 2/2004 | Banerjee et al. | |
| 2008/0038995 A1 * | 2/2008 | Small et al. | 451/37 |

FOREIGN PATENT DOCUMENTS

| | | |
|---|---|---|
| EP | 1 211 024 A2 | 6/2002 |
| WO | WO 02/26906 A1 | 4/2002 |
| WO | WO 0226906 A1 * | 4/2002 |

OTHER PUBLICATIONS

Corrosion Doctors, Titanium Corrosion, unkown, Corrosion Doctors.*
Wikipedia, Titanium, unkown, Wikipedia.*
About.com, Solubility Rules; Ionic Solids in Water (retrieved from http://chemistry.about.com/library/weekly/blsolubility.htm on Feb. 24, 2009).
Ahmadi et al., *Journal of The Electrochemical Society*, 148(3): 1-27 (Mar. 2001).
Chemfinder.com, *Aluminum Oxide* (retrieved from http://chemfinder.cambridgesoft.com/result.asp on Oct. 11, 2005).
Marinescu et al. (eds), *Handbook of Ceramic Grinding and Polishing* (William Andrew Publishing/Noyes Publications, Westwood, NJ, 2000), p. 21.

* cited by examiner

*Primary Examiner* — Binh X Tran
*Assistant Examiner* — David Cathey, Jr.
(74) *Attorney, Agent, or Firm* — Thomas E. Omholt; Emer L. Simic; Steven D. Weseman

(57) ABSTRACT

The invention provides methods of polishing a noble metal-containing substrate with one of two chemical-mechanical polishing compositions. The first chemical-mechanical polishing composition comprises (a) an abrasive comprising α-alumina, (b) about 0.05 to about 50 mmol/kg of ions of calcium, strontium, barium, or mixtures thereof, and (c) a liquid carrier comprising water. The second chemical-mechanical polishing composition comprises (a) an abrasive selected from the group consisting of α-alumina, γ-alumina, δ-alumina, θ-alumina, diamond, boron carbide, silicon carbide, tungsten carbide, titanium nitride, and mixtures thereof, (b) about 0.05 to about 3.5 mmol/kg of ions of calcium, strontium, barium, magnesium, zinc, or mixtures thereof, and (c) a liquid carrier comprising water.

18 Claims, No Drawings

CHEMICAL-MECHANICAL POLISHING COMPOSITION AND METHOD FOR USING THE SAME

CROSS-REFERENCE TO RELATED APPLICATIONS

This patent application is a divisional of U.S. patent application Ser. No. 10/807,944, filed Mar. 24, 2004, now abandoned, which application is incorporated herein by reference.

FIELD OF THE INVENTION

This invention pertains to a chemical-mechanical polishing composition and a method of polishing a substrate using the same.

BACKGROUND OF THE INVENTION

In the fabrication of integrated circuits and other electronic devices, multiple layers of conducting, semiconducting, and dielectric materials are deposited onto or removed from a substrate surface. Thin layers of conducting, semiconducting, and dielectric materials may be deposited onto the substrate surface by a number of deposition techniques. Deposition techniques common in modem microelectronics processing include physical vapor deposition (PVD), also known as sputtering, chemical vapor deposition (CVD), plasma-enhanced chemical vapor deposition (PECVD), and electrochemical plating (ECP).

As layers of materials are sequentially deposited onto and removed from the substrate, the uppermost surface of the substrate may become non-planar and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical-mechanical planarization, or chemical-mechanical polishing (CMP), is a common technique used to planarize substrates. CMP utilizes a chemical composition, typically a slurry or other fluid medium, for selective removal of material from the substrate. In conventional CMP techniques, a substrate carrier or polishing head is mounted on a carrier assembly and positioned in contact with a polishing pad in a CMP apparatus. The carrier assembly provides a controllable pressure to the substrate, urging the substrate against the polishing pad. The pad is moved relative to the substrate by an external driving force. The relative movement of the pad and substrate serves to abrade the surface of the substrate to remove a portion of the material from the substrate surface, thereby polishing the substrate. The polishing of the substrate by the relative movement of the pad and the substrate typically is further aided by the chemical activity of the polishing composition and/or the mechanical activity of an abrasive suspended in the polishing composition.

As the demand for ever smaller storage devices capable of storing ever larger amounts of information increases, electronics manufacturers have begun to manufacture increasingly complicated integrated circuits utilizing exotic materials. For example, the use of noble metals in DRAMs (dynamic random access memory) and FeRAMs (ferroelectric random access memory) is becoming increasingly popular. While the use of noble metals can provide increased performance in such devices, the use of noble metals can—and often does—present unique manufacturing challenges. In particular, noble metals are mechanically hard and chemically resistant. Indeed, the term noble metal was adopted to describe the metals' superior resistance to corrosion and oxidation. This mechanical hardness and relative chemical resistance make noble metals much more difficult to efficiently polish using conventional chemical-mechanical polishing compositions and techniques.

Notwithstanding the difficulties presented by the chemical-mechanical polishing of noble metals, their potential benefits have driven their use in the manufacture of integrated circuits, and several attempts have been made to develop chemical-mechanical polishing compositions and techniques aimed at aiding their integration into integrated circuit manufacture and the realization of the full potential that can result from their use. For example, U.S. Pat. No. 5,691,219 discloses a polishing composition comprising a halo-compound that is purportedly useful in the polishing of noble metals. Similarly, U.S. Pat. No. 6,290,736 discloses a chemically active polishing composition for noble metals comprising an abrasive and a halogen in basic aqueous solution. WO 01/44396 A1 discloses a polishing composition for noble metals comprising sulfur-containing compounds, abrasive particles, and water-soluble organic additives which purportedly improve the dispersion of the abrasive particles and enhance metal removal rates and selectivity.

While each of the aforementioned chemical-mechanical polishing compositions might be capable of polishing noble metals more efficiently than conventional chemical-mechanical polishing compositions, the compositions also can produce defects on the surface of the substrate that can negatively impact the performance of any integrated circuit later manufactured from the substrate. Furthermore, the halogen- and sulfur-containing compounds utilized in the aforementioned polishing compositions can be highly toxic (which can complicate the polishing process by requiring specialized handling equipment and/or procedures), expensive to produce, and/or expensive to properly dispose of in accordance with environmental regulations.

A need therefore remains for a chemical-mechanical polishing composition that is capable of polishing noble metal containing substrates more efficiently than conventional chemical-mechanical polishing compositions without the need for using specialized oxidizers or chemical etchants. The invention provides such a chemical-mechanical polishing composition and related method of using the same to polish a substrate. These and other advantages of the invention, as well as additional inventive features, will be apparent from the description of the invention provided herein.

BRIEF SUMMARY OF THE INVENTION

The invention provides a chemical-mechanical polishing composition comprising: (a) an abrasive comprising α-alumina, (b) about 0.05 to about 50 millimoles per kilogram (mmol/kg) of ions of at least one metal selected from the group consisting of calcium, strontium, barium, and mixtures thereof, based on the total weight of the polishing composition, and (c) a liquid carrier comprising water.

The invention also provides a chemical-mechanical polishing composition comprising: (a) an abrasive selected from the group consisting of α-alumina, γ-alumina, δ-alumina, θ-alumina, diamond, boron carbide, silicon carbide, tungsten carbide, titanium nitride, and mixtures thereof, (b) about 0.05 to about 3.5 mmol/kg of ions of at least one metal selected from the group consisting of calcium, strontium, barium, magnesium, zinc, and mixtures thereof, based on the total weight of the polishing composition, and (c) a liquid carrier comprising water.

The invention further provides a method of polishing a substrate comprising the steps of: (a) providing a substrate, (b) providing a chemical-mechanical polishing composition comprising: (i) an abrasive comprising α-alumina, (ii) about 0.05 to about 50 millimoles per kilogram (mmol/kg) of ions of at least one metal selected from the group consisting of calcium, strontium, barium, and mixtures thereof, based on the total weight of the polishing composition, and (iii) a liquid carrier comprising water, (c) applying the chemical-mechanical polishing composition to at least a portion of the substrate, and (d) abrading at least a portion of the substrate with the polishing composition to polish the substrate.

The invention additionally provides a method of polishing a substrate comprising the steps of: (a) providing a substrate, (b) providing a chemical-mechanical polishing composition comprising: (i) an abrasive selected from the group consisting of α-alumina, γ-alumina, δ-alumina, θ-alumina, diamond, boron carbide, silicon carbide, tungsten carbide, titanium nitride, and mixtures thereof, (ii) about 0.05 to about 3.5 mmol/kg of ions of at least one metal selected from the group consisting of calcium, strontium, barium, magnesium, zinc, and mixtures thereof, based on the total weight of the polishing composition, and (iii) a liquid carrier comprising water, (c) applying the chemical-mechanical polishing composition to at least a portion of the substrate, and (d) abrading at least a portion of the substrate with the polishing composition to polish the substrate.

DETAILED DESCRIPTION OF THE INVENTION

The invention provides a chemical-mechanical polishing composition comprising (a) an abrasive, (b) ions of at least one metal selected from the group consisting of calcium, strontium, barium, magnesium, zinc, and mixtures thereof, and (c) a liquid carrier comprising water. In one embodiment, the chemical-mechanical polishing composition comprises (a) an abrasive comprising α-alumina, (b) about 0.05 to about 50 millimoles per kilogram (mmol/kg) of ions of at least one metal selected from the group consisting of calcium, strontium, barium, and mixtures thereof, based on the total weight of the polishing composition, and (c) a liquid carrier comprising water. In another embodiment, the chemical-mechanical polishing composition comprises (a) an abrasive comprising α-alumina, (b) about 0.05 to about 3.5 millimoles per kilogram (mmol/kg) of ions of at least one metal selected from the group consisting of magnesium, zinc, and mixtures thereof, based on the total weight of the polishing composition, and (c) a liquid carrier comprising water. In yet another embodiment, the chemical-mechanical polishing composition comprises (a) an abrasive selected from the group consisting of α-alumina, γ-alumina, δ-alumina, θ-alumina, diamond, boron carbide, silicon carbide, tungsten carbide, titanium nitride, and mixtures thereof, (b) about 0.05 to about 3.5 mmol/kg of ions of at least one metal selected from the group consisting of calcium, strontium, barium, magnesium, zinc, and mixtures thereof, based on the total weight of the polishing composition, and (c) a liquid carrier comprising water. Aside from the abrasive and the identity and concentration of the metal ions present in the embodiments of the chemical-mechanical polishing composition of the invention, the other characteristics of the chemical-mechanical polishing composition of the invention (e.g., the amount of abrasive, the liquid carrier, the pH, and other suitable additives) can be the same.

The polishing composition comprises an abrasive, and, in certain embodiments, the abrasive comprises α-alumina. As known to those of ordinary skill in the art, alumina (i.e., aluminum oxide) exists is several different crystalline phases, which include α-alumina, γ-alumina, δ-alumina, θ-alumina, κ-alumina, η-alumina, χ-alumina, and ρ-alumina. The α-alumina, when present in the abrasive, can be present in any suitable form. More specifically, the α-alumina can be present in the form of distinct abrasive particles consisting essentially of, or consisting of, α-alumina, or the α-alumina can be present in abrasive particles comprising α-alumina and other suitable abrasive components (e.g., a metal oxide, such as fumed alumina). When the abrasive comprises α-alumina, the abrasive preferably comprises about 10 wt. % or more, more preferably about 20 wt. % or more, still more preferably about 30 wt. % or more, even more preferably about 40 wt. % or more, and most preferably about 50 wt. % or more (e.g., about 55 wt. % or more, or about 60 wt. % or more) α-alumina based on the total weight of the abrasive.

As noted above, the invention also provides a chemical-mechanical polishing composition comprising an abrasive selected from the group consisting of α-alumina, γ-alumina, δ-alumina, θ-alumina, diamond, boron carbide, silicon carbide, tungsten carbide, titanium nitride, and mixtures thereof. In such an embodiment, the abrasive preferably is selected from the group consisting of α-alumina, γ-alumina, δ-alumina, θ-alumina, diamond, silicon carbide, titanium nitride, and mixtures thereof. More preferably, the abrasive is selected from the group consisting of α-alumina, γ-alumina, δ-alumina, θ-alumina, diamond, silicon carbide, and mixtures thereof. Most preferably, the abrasive is selected from the group consisting of α-alumina, γ-alumina, δ-alumina, θ-alumina, and mixtures thereof.

In addition to the aforementioned abrasive components, the abrasive of the polishing composition can further comprise other suitable abrasive components. Suitable additional abrasive components include, but are not limited to, metal oxide abrasives, such as other forms of alumina (e.g., fumed alumina), silica (e.g., colloidally dispersed condensation-polymerized silica, fumed or pyrogenic silica, and precipitated silica), ceria, titania, zirconia, chromia, iron oxide, germania, magnesia, co-formed products thereof, and combinations thereof.

The abrasive can be present in the polishing composition in any suitable amount. Typically, the abrasive is present in the polishing composition in an amount of about 0.01 wt. % or more, preferably about 0.05 wt. % or more, more preferably about 0.1 wt. % or more, still more preferably about 0.5 wt. % or more, and most preferably about 1 wt. % or more, based on the total weight of the polishing composition. The abrasive typically is present in the polishing composition in an amount of about 25 wt. % or less, preferably about 20 wt. % or less, more preferably about 15 wt. % or less, still more preferably about 10 wt. % or less, and most preferably about 5 wt. % or less, based on the total weight of the polishing composition.

In one embodiment, the polishing composition comprises ions of at least one metal selected from the group consisting of calcium, strontium, barium, and mixtures thereof. In a second embodiment, the polishing composition comprises ions of at least one metal selected from the group consisting of magnesium, zinc, and mixtures thereof. In a third embodiment, the polishing composition comprises ions of at least one metal selected from the group consisting of calcium, strontium, barium, magnesium, zinc, and mixtures thereof. The ions of the metal(s) contained in the polishing composition can be derived from any suitable source. Preferably, the ions of the metal(s) contained in the polishing composition are derived from at least one water-soluble metal salt.

The ions of the metal can be present in the polishing composition in any suitable amount. Generally, the ions of the metal are present in the polishing composition in an amount of about 0.05 millimoles per kilogram (mmol/kg) or more, preferably about 0.06 mmol/kg or more, more preferably about 0.07 mmol/kg or more, and most preferably about 1 mmol/kg or more, based on the total weight of the polishing composition. The ions of the metal generally are present in the polishing composition in an amount of about 50 mmol/kg or less, preferably about 40 mmol/kg or less, more preferably about 30 mmol/kg or less, and most preferably about 20 mmol/kg or less (e.g., about 10 mmol/kg or less, about 5 mmol/kg or less, or about 3.5 mmol/kg or less), based on the total weight of the polishing composition. In certain embodiments, such as when the polishing composition comprises ions of at least one metal selected from the group consisting of calcium, strontium, barium, and mixtures thereof, the ions of the metal preferably are present in the polishing composition in an amount of about 0.05 to about 50 millimoles per kilogram (mmol/kg), more preferably about 0.05 to about 40 mmol/kg (e.g., about 0.05 to about 30 mmol/kg, about 0.05 to about 25 mmol/kg, about 0.05 to about 20 mmol/kg, or about 0.05 to about 15 mmol/kg), still more preferably about 0.05 to about 10 mmol/kg, and most preferably about 0.05 to about 5 mmol/kg, based on the total weight of the polishing composition. When the polishing composition comprises ions of at least one metal selected from the group consisting of magnesium, zinc, and mixtures thereof, or the polishing composition comprises an abrasive selected from the group consisting of α-alumina, γ-alumina, δ-alumina, θ-alumina, diamond, boron carbide, silicon carbide, tungsten carbide, titanium nitride, and mixtures thereof, the ions of the metal preferably are present in the polishing composition in an amount of about 0.05 to about 3.5 millimoles per kilogram (mmol/kg), more preferably about 0.05 to about 3.4 mmol/kg (e.g., about 0.05 to about 3.3 mmol/kg, about 0.05 to about 3.25 mmol/kg, about 0.05 to about 3.2 mmol/kg, or about 0.05 to about 3.1 mmol/kg), and most preferably about 0.05 to about 3 mmol/kg, based on the total weight of the polishing composition.

A liquid carrier is used to facilitate the application of the abrasive, metal ions, and any other additives to the surface of a suitable substrate to be polished or planarized. The liquid carrier can be any suitable liquid carrier. As noted above, the liquid carrier comprises water. Preferably, the water is deionized water. The liquid carrier can further comprise a suitable water-miscible solvent. However, in certain preferred embodiments the liquid carrier consists essentially of, or consists of, water, more preferably deionized water.

The polishing composition can have any suitable pH (e.g., about 1 to about 13). Preferably, the polishing composition has a pH of about 1 to about 7, more preferably about 2 to about 5. The pH of the chemical-mechanical polishing system can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be potassium hydroxide, sodium hydroxide, ammonium hydroxide, or a combination thereof. The pH buffering agent can be any suitable buffering agent, for example, phosphates, acetates, borates, ammonium salts, and the like. The chemical-mechanical polishing system can comprise any suitable amount of a pH adjustor and/or a pH buffering agent, provided such amount is sufficient to achieve and/or maintain the pH of the polishing system within the ranges set forth herein.

The polishing composition can further comprise an acid. The acid can be any suitable acid, such as an inorganic or an organic acid, or a combination thereof. For example, the polishing composition can comprise an inorganic acid selected from the group consisting of nitric acid, phosphoric acid, sulfuric acid, salts thereof, and combinations thereof. The polishing composition can comprise (alternatively or in addition to the inorganic acid) an organic acid selected from the group consisting of oxalic acid, malic acid, malonic acid, tartaric acid, acetic acid, lactic acid, propionic acid, phthalic acid, benzoic acid, citric acid, succinic acid, salts thereof, and combinations thereof. When present, the acid(s) can be present in the polishing composition in any suitable amount(s).

The polishing composition also can comprise a corrosion inhibitor (i.e., a film-forming agent). The corrosion inhibitor can be any suitable corrosion inhibitor. Typically, the corrosion inhibitor is an organic compound containing a heteroatom-containing functional group. For example, the corrosion inhibitor can be a heterocyclic organic compound with at least one 5- or 6-member heterocyclic ring as the active functional group, wherein the heterocyclic ring contains at least one nitrogen atom, for example, an azole compound. Preferably, the corrosion inhibitor contains at least one azole group. More preferably, the corrosion inhibitor is selected from the group consisting of 1,2,3-triazole, 1,2,4-triazole, benzotriazole, benzimidazole, benzothiazole, and mixtures thereof. The amount of corrosion inhibitor used in the polishing system typically is about 0.0001 wt. % to about 3 wt. % (preferably about 0.001 wt. % to about 2 wt. %) based on the total weight of the polishing composition.

The polishing composition optionally further comprises a chelating or complexing agent. The complexing agent is any suitable chemical additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid, and the like) and amine-containing compounds (e.g., ammonia, amino acids, amino alcohols, di-, tri-, and polyamines, and the like). The choice of chelating or complexing agent will depend on the type of substrate layer being removed.

It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof, phthalates include phthalic acid, as well as mono-salts (e.g., potassium hydrogen phthalate) and di-salts thereof; perchlorates include the corresponding acid (i.e., perchloric acid), as well as salts thereof. Furthermore, certain compounds or reagents may perform more than one function. For example, some compounds can function both as a chelating agent and an oxidizing agent (e.g., certain ferric nitrates and the like).

The polishing composition can further comprise a surfactant. Suitable surfactants can include, for example, cationic surfactants, anionic surfactants, nonionic surfactants, amphoteric surfactants, mixtures thereof, and the like. Preferably, the polishing composition comprises a nonionic surfactant. One example of a suitable nonionic surfactant is an ethylenediamine polyoxyethylene surfactant. The amount of surfactant typically is about 0.0001 wt. % to about 1 wt. % (preferably about 0.001 wt. % to about 0.1 wt. %, and more preferably about 0.005 wt. % to about 0.05 wt. %) based on the total weight of the polishing composition.

The polishing composition can further comprise an anti-foaming agent. The anti-foaming agent can be any suitable anti-foaming agent. Suitable antifoaming agents include, but are not limited to, silicon-based and acetylenic diol-based antifoaming agents. The amount of anti-foaming agent present in the polishing composition typically is about 10 ppm to about 140 ppm.

The polishing composition can also comprise a biocide. The biocide can be any suitable biocide, for example an isothiazolinone biocide. The amount of biocide used in the polishing composition typically is about 1 to about 50 ppm, preferably about 10 to about 20 ppm.

The polishing composition preferably is colloidally stable. The term colloid refers to the suspension of the abrasive (e.g., abrasive particles) in the liquid carrier. Colloidal stability refers to the maintenance of that suspension through time. A polishing composition is considered colloidally stable if, when the polishing composition is placed into a 100 ml graduated cylinder and allowed to stand unagitated for a time of 2 hours, the difference between the concentration of abrasive (e.g., abrasive particles) in the bottom 50 ml of the graduated cylinder ([B] in terms of g/ml) and the concentration of abrasive (e.g., abrasive particles) in the top 50 ml of the graduated cylinder ([T] in terms of g/ml) divided by the initial concentration of abrasive (e.g., abrasive particles) in the polishing composition ([C] in terms of g/ml) is less than or equal to 0.5 (i.e., $\{[B]-[T]\}/[C] \leq 0.5$). Preferably, the value of $[B]-[T]/[C]$ is less than or equal to 0.3, more preferably is less than or equal to 0.1, even more preferably is less than or equal to 0.05, and most preferably is less than or equal to 0.01.

The average particle size of the polishing composition preferably remains essentially unchanged throughout the useful life of the polishing composition. In particular, the average particle size of the polishing composition preferably increases by less than about 40% (e.g., less than about 35%, less than about 30%, less than about 25%, less than about 20%, less than about 15%, or less than about 10%) throughout the useful life of the polishing composition (e.g., about 90 days or more, about 180 days or more, or about 365 days or more).

The invention further provides methods of polishing a substrate with the polishing compositions as described herein. The methods generally comprise the steps of (i) providing a substrate, (ii) providing a polishing composition as described herein, (iii) applying the polishing composition to a portion of the substrate, and (iv) abrading a portion of the substrate to polish the substrate.

In one embodiment of such a method, the method of polishing a substrate comprises the steps of: (a) providing a substrate, (b) providing a chemical-mechanical polishing composition comprising: (i) an abrasive comprising α-alumina, (ii) about 0.05 to about 50 millimoles per kilogram (mmol/kg) of ions of at least one metal selected from the group consisting of calcium, strontium, barium, and mixtures thereof, based on the total weight of the polishing composition, and (iii) a liquid carrier comprising water, (c) applying the chemical-mechanical polishing composition to at least a portion of the substrate, and (d) abrading at least a portion of the substrate with the polishing composition to polish the substrate.

The polishing composition utilized in this method embodiment of the invention comprises: (a) an abrasive comprising α-alumina, (b) about 0.05 to about 50 millimoles per kilogram (mmol/kg) of ions of at least one metal selected from the group consisting of calcium, strontium, barium, and mixtures thereof, based on the total weight of the polishing composition, and (c) a liquid carrier comprising water. The other characteristics of the chemical-mechanical polishing composition utilized in this method embodiment of the invention (e.g., the amount of abrasive, the liquid carrier, the pH, and other suitable additives) can be the same as set forth above for the chemical-mechanical polishing composition of the invention.

In another embodiment, the method of polishing a substrate comprises the steps of: (a) providing a substrate, (b) providing a chemical-mechanical polishing composition comprising: (i) an abrasive comprising α-alumina, (ii) about 0.05 to about 3.5 millimoles per kilogram (mmol/kg) of ions of at least one metal selected from the group consisting of magnesium, zinc, and mixtures thereof, based on the total weight of the polishing composition, and (iii) a liquid carrier comprising water, (c) applying the chemical-mechanical polishing composition to at least a portion of the substrate, and (d) abrading at least a portion of the substrate with the polishing composition to polish the substrate.

The polishing composition utilized in this method embodiment of the invention comprises: (a) an abrasive comprising α-alumina, (b) about 0.05 to about 3.5 millimoles per kilogram (mmol/kg) of ions of at least one metal selected from the group consisting of magnesium, zinc, and mixtures thereof, based on the total weight of the polishing composition, and (c) a liquid carrier comprising water. The other characteristics of the chemical-mechanical polishing composition utilized in this method embodiment of the invention (e.g., the amount of abrasive, the liquid carrier, the pH, and other suitable additives) can be the same as set forth above for the chemical-mechanical polishing composition of the invention.

In a third embodiment, the method of polishing a substrate comprises the steps of: (a) providing a substrate, (b) providing a chemical-mechanical polishing composition comprising: (i) an abrasive selected from the group consisting of α-alumina, γ-alumina, δ-alumina, θ-alumina, diamond, boron carbide, silicon carbide, tungsten carbide, titanium nitride, and mixtures thereof, (ii) about 0.05 to about 3.5 mmol/kg of ions of at least one metal selected from the group consisting of calcium, strontium, barium, magnesium, zinc, and mixtures thereof, based on the total weight of the polishing composition, and (iii) a liquid carrier comprising water, (c) applying the chemical-mechanical polishing composition to at least a portion of the substrate, and (d) abrading at least a portion of the substrate with the polishing composition to polish the substrate.

The polishing composition utilized in this method embodiment of the invention comprises: (a) an abrasive selected from the group consisting of α-alumina, γ-alumina, δ-alumina, θ-alumina, diamond, boron carbide, silicon carbide, tungsten carbide, titanium nitride, and mixtures thereof, (b) about 0.05 to about 3.5 mmol/kg of ions of at least one metal selected from the group consisting of calcium, strontium, barium, magnesium, zinc, and mixtures thereof, based on the total weight of the polishing composition, and (c) a liquid carrier comprising water. The other characteristics of the chemical-mechanical polishing composition utilized in this method embodiment of the invention (e.g., the amount of abrasive, the liquid carrier, the pH, and other suitable additives) can be the same as set forth above for the chemical-mechanical polishing composition of the invention.

The substrate to be polished using the methods of the invention can be any suitable substrate. Suitable substrates include, but are not limited to, integrated circuits, memory or rigid disks, metals, interlayer dielectric (ILD) devices, semiconductors, micro-electro mechanical systems, ferroelectrics, and magnetic heads. The metal layer can comprise any suitable metal. For example, the metal layer can comprise copper, tantalum (e.g., tantalum nitride), titanium, aluminum, nickel, platinum, ruthenium, iridium, or rhodium. The substrate can further comprise at least one insulating layer. The insulating layer can be a metal oxide, porous metal oxide, glass, organic polymer, fluorinated organic polymer, or any other suitable high or low-κ insulating layer. Preferably, the substrate comprises a noble metal, and at least a portion of the noble metal is abraded with the polishing composition to polish the substrate. Suitable noble metal include, but are not limited to, platinum, iridium, ruthenium, rhodium, palladium, silver, osmium, gold, and combinations thereof. Preferably, the substrate comprises platinum, and at least a portion of the platinum is abraded with the polishing composition to polish the substrate.

The polishing methods of the invention are particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

Desirably, the CMP apparatus further comprises an in situ polishing endpoint detection system, many of which are known in the art. Techniques for inspecting and monitoring the polishing process by analyzing light or other radiation reflected from a surface of the substrate are known in the art. Desirably, the inspection or monitoring of the progress of the polishing process with respect to a substrate being polished enables the determination of the polishing end-point, i.e., the determination of when to terminate the polishing process with respect to a particular substrate.

The CMP apparatus can further comprise a means for oxidizing the substrate. In electrochemical polishing systems, the means for oxidizing the substrate preferably comprises a device for applying a time-varying potential (e.g., anodic potential) to the substrate (e.g., electronic potentiostat). The device for applying time-varying potential to the substrate can be any suitable such device. The means for oxidizing the substrate preferably comprises a device for applying a first potential (e.g., a more oxidizing potential) during an initial stage of the polishing and applying a second potential (e.g., a less oxidizing potential) at or during a later stage of polishing, or a device for changing the first potential to the second potential during an intermediate stage of polishing, e.g., continuously reducing the potential during the intermediate stage or rapidly reducing the potential from a first, higher oxidizing potential to a second, lower oxidizing potential after a predetermined interval at the first, higher oxidizing potential. For example, during the initial stage(s) of the polishing, a relatively high oxidizing potential is applied to the substrate to promote a relatively high rate of oxidation/ dissolution/removal of the substrate. When polishing is at a later stage, e.g., when approaching an underlying barrier layer, the applied potential is reduced to a level producing a substantially lower or negligible rate of oxidation/dissolution/removal of the substrate, thereby eliminating or substantially reducing dishing, corrosion, and erosion. The time-varying electrochemical potential is preferably applied using a controllably variable DC power supply, e.g., an electronic potentiostat. U.S. Pat. No. 6,379,223 further describes a means for oxidizing a substrate by applying a potential.

The following examples further illustrate the invention but, of course, should not be construed as in any way limiting its scope.

EXAMPLE 1

This example demonstrates the enhanced polishing rate exhibited by the polishing composition of the invention. Similar substrates comprising platinum were polished using four different polishing compositions (Polishing Compositions 1A, 1B, 1C, and 1D). Polishing Composition 1A (comparative) did not comprise an appreciable amount of metals ions. Polishing Composition 1B (invention) comprised about 0.38 mmol/kg (approximately 15 ppm) of calcium (as calcium chloride). Polishing Composition 1C (invention) comprised about 0.38 mmol/kg (approximately 33 ppm) of strontium (as strontium chloride). Polishing Composition 1D (invention) comprised about 0.37 mmol/kg (approximately 51 ppm) of barium (as barium chloride). Each of the aforementioned polishing compositions also comprised about 3 wt. % of an abrasive comprising, based on the total weight of the abrasive, approximately 60 wt. % α-alumina and approximately 40 wt. % fumed alumina, and had a pH of about 3. The values for the platinum removal rate (in angstroms per minute) were measured for each of the polishing compositions. The results are summarized in Table 1.

TABLE 1

| Platinum removal rates. | | | |
| --- | --- | --- | --- |
| Polishing Composition | Metal | Concentration (mmol/kg) | Platinum Removal Rate (Å/min) |
| 1A (comparative) | — | — | 496 |
| 1B (invention) | Ca | 0.38 | 1450 |
| 1C (invention) | Sr | 0.38 | 1551 |
| 1D (invention) | Ba | 0.37 | 1636 |

These results demonstrate that the polishing composition of the invention exhibits a high platinum removal rate as compared to similar polishing compositions comprising no appreciable amount of metal ions. In particular, Polishing Compositions 1B-1D (invention), which comprised approximately 0.37 to 0.38 mmol/kg of ions of a metal selected from the group consisting of calcium, strontium, and barium, each exhibited a platinum removal rate that was approximately 200% or more higher that the platinum removal rate for Polishing Composition 1A (comparative), which did not contain an appreciable amount of ions of calcium, strontium, or barium.

EXAMPLE 2

This example demonstrates the enhanced polishing rate exhibited by the polishing composition of the invention. Similar substrates comprising platinum were polished using three different polishing compositions (Polishing Compositions 2A, 2B, and 2C). Polishing Composition 2A (comparative) did not comprise an appreciable amount of metals ions. Polishing Composition 2B (invention) comprised about 0.4 mmol/kg (approximately 9 ppm) of magnesium (as magnesium chloride). Polishing Composition 2C (invention) comprised about 0.74 mmol/kg (approximately 18 ppm) of magnesium (as magnesium chloride). Each of the aforementioned polishing compositions also comprised about 3 wt. % of an abrasive comprising, based on the total weight of the abrasive, approximately 60 wt. % α-alumina and approximately 40 wt. % fumed alumina, and had a pH of about 3. The values for the platinum removal rate (in angstroms per minute) were measured for each of the polishing compositions. The results are summarized in Table 2.

TABLE 2

Platinum removal rates.

| Polishing Composition | Metal | Concentration (mmol/kg) | Platinum Removal Rate (Å/min) |
|---|---|---|---|
| 2A (comparative) | — | — | 1263 |
| 2B (invention) | Mg | 0.4 | 1645 |
| 2C (invention) | Mg | 0.74 | 2246 |

These results demonstrate that the polishing composition of the invention exhibits a high platinum removal rate as compared to similar polishing compositions comprising no appreciable amount of metal ions. In particular, Polishing Compositions 2B and 2C (invention), which comprised approximately 0.4 and 0.74 mmol/kg of ions of magnesium, each exhibited a platinum removal rate that was approximately 30% and 75%, respectively, greater that the platinum removal rate for Polishing Composition 2A (comparative), which did not contain an appreciable amount of magnesium ions.

EXAMPLE 3

This example demonstrates the enhanced polishing rate exhibited by the polishing composition of the invention. Similar substrates comprising platinum were polished using six different polishing compositions (Polishing Compositions 3A, 3B, 3C, 3D, 3E, and 3F). Polishing Composition 3A (comparative) did not comprise an appreciable amount of metals ions. Polishing Composition 3B (comparative) comprised about 0.74 mmol/kg of aluminum (as aluminum nitrate). Polishing Composition 3C (comparative) comprised about 3.0 mmol/kg of aluminum (as aluminum nitrate). Polishing Composition 3D (invention) comprised about 0.74 mmol/kg (approximately 18 ppm) of magnesium (as magnesium chloride). Polishing Composition 3E (invention) comprised about 0.75 mmol/kg (approximately 49 ppm) of zinc (as zinc chloride). Polishing Composition 3F (invention) comprised about 1.5 mmol/kg (approximately 96 ppm) of zinc (as zinc chloride). Each of the aforementioned polishing compositions also comprised about 3 wt. % of an abrasive comprising, based on the total weight of the abrasive, approximately 60 wt. % α-alumina and approximately 40 wt. % fumed alumina, and had a pH of about 3. The values for the platinum removal rate (in angstroms per minute) were measured for each of the polishing compositions. The results are summarized in Table 3.

TABLE 3

Platinum removal rates.

| Polishing Composition | Metal | Concentration (mmol/kg) | Platinum Removal Rate (Å/min) |
|---|---|---|---|
| 3A (comparative) | — | — | 455 |
| 3B (comparative) | Al | 0.74 | 452 |
| 3C (comparative) | Al | 3.0 | 476 |
| 3D (invention) | Mg | 0.74 | 942 |
| 3E (invention) | Zn | 0.75 | 920 |
| 3F (invention) | Zn | 1.5 | 839 |

These results demonstrate that the polishing composition of the invention exhibits a high platinum removal rate as compared to similar polishing compositions comprising no appreciable amount of metal ions or a similar amount of different metal ions. In particular, Polishing Compositions 3D-3F (invention), which comprised approximately 0.74 to 1.5 mmol/kg of ions of a metal selected from the group consisting of magnesium and zinc, each exhibited a platinum removal rate that was approximately 80% or more higher that the platinum removal rate for Polishing Compositions 3A-3C (comparative), which did not contain an appreciable amount of ions of magnesium or zinc.

EXAMPLE 4

This example demonstrates the enhanced polishing rate exhibited by the polishing composition of the invention. Similar substrates comprising platinum (from a different lot than those used in Examples 1, 2, 3, and 5) were polished using seven different polishing compositions (Polishing Compositions 4A, 4B, 4C, 4D, 4E, 4F, and 4G). Polishing Composition 4A (comparative) did not comprise an appreciable amount of metals ions. Polishing Composition 4B (comparative) comprised about 0.74 mmol/kg (approximately 29 ppm) of potassium (as potassium chloride). Polishing Composition 4C (comparative) comprised about 0.74 mmol/kg (approximately 29 ppm) of potassium (as potassium sulfate). Polishing Composition 4D (invention) comprised about 0.74 mmol/kg (approximately 18 ppm) of magnesium (as magnesium chloride). Polishing Composition 4E (invention) comprised about 1.5 mmol/kg (approximately 36 ppm) of magnesium (as magnesium chloride). Polishing Composition 4F (invention) comprised about 3.0 mmol/kg (approximately 72 ppm) of magnesium (as magnesium chloride). Polishing Composition 4G (invention) comprised about 5.9 mmol/kg (approximately 144 ppm) of magnesium (as magnesium chloride). Each of the aforementioned polishing compositions also comprised about 3 wt. % of an abrasive comprising, based on the total weight of the abrasive, approximately 60 wt. % α-alumina and approximately 40 wt. % fumed alumina, and had a pH of about 3. The values for the platinum removal rate (in angstroms per minute) were measured for each of the polishing compositions. The results are summarized in Table 4.

TABLE 4

Platinum removal rates.

| Polishing Composition | Metal | Concentration (mmol/kg) | Platinum Removal Rate (Å/min) |
|---|---|---|---|
| 4A (comparative) | — | — | 2540 |
| 4B (comparative) | K | 0.74 | 2335 |
| 4C (comparative) | K | 0.74 | 2054 |
| 4D (invention) | Mg | 0.74 | ≧4000 |

TABLE 4-continued

Platinum removal rates.

| Polishing Composition | Metal | Concentration (mmol/kg) | Platinum Removal Rate (Å/min) |
|---|---|---|---|
| 4E (invention) | Mg | 1.5 | ≧4000 |
| 4F (invention) | Mg | 3.0 | ≧4000 |
| 4G (invention) | Mg | 5.9 | ≧4000 |

These results demonstrate that the polishing composition of the invention exhibits a high platinum removal rate as compared to similar polishing compositions comprising no appreciable amount of metal ions or a similar amount of different metal ions. In particular, Polishing Compositions 4D-4G (invention), which comprised approximately 0.74 to 5.9 mmol/kg of magnesium, each exhibited a platinum removal rate that was greater than or equal to 4000 Å/min. Such a removal rate was significantly greater than that observed for Polishing Compositions 4A-4C (comparative), which did not contain appreciable amounts of magnesium. The platinum removal rates for each of Polishing Compositions 4D-4G (invention) could only be reported as a minimum value because the entire 4000 Å thickness of the platinum layer on each substrate was removed within the 1 minute polishing run.

EXAMPLE 5

This example demonstrates the enhanced polishing rate exhibited by the polishing composition of the invention. Similar substrates comprising platinum were polished using four different polishing compositions (Polishing Compositions 5A, 5B, 5C, and 5D). Polishing Composition 5A (comparative) did not comprise an appreciable amount of metals ions. Polishing Composition 5B (invention) comprised about 0.19 mmol/kg (approximately 26 ppm) of barium (as barium chloride). Polishing Composition 5C (invention) comprised about 0.37 mmol/kg (approximately 51 ppm) of barium (as barium chloride). Polishing Composition 5D (invention) comprised about 0.743 mmol/kg (approximately 102 ppm) of barium (as barium chloride). Each of the aforementioned polishing compositions also comprised about 3 wt. % of an abrasive comprising, based on the total weight of the abrasive, approximately 60 wt. % α-alumina and approximately 40 wt. % fumed alumina, and had a pH of about 3. The values for the platinum removal rate (in angstroms per minute) were measured for each of the polishing compositions. The results are summarized in Table 5.

TABLE 5

Platinum removal rates.

| Polishing Composition | Metal | Concentration (mmol/kg) | Platinum Removal Rate (Å/min) |
|---|---|---|---|
| 5A (comparative) | — | — | 388 |
| 5B (invention) | Ba | 0.19 | 1314 |
| 5C (invention) | Ba | 0.37 | 1408 |
| 5D (invention) | Ba | 0.743 | 1707 |

These results demonstrate that the polishing composition of the invention exhibits a high platinum removal rate as compared to similar polishing compositions comprising no appreciable amount of metal ions. In particular, Polishing Compositions 5B-5D (invention), which comprised approximately 0.19 to 0.743 mmol/kg of barium ions, each exhibited a platinum removal rate that was approximately 240% or more higher that the platinum removal rate for Polishing Composition 1A (comparative), which did not contain an appreciable amount of barium ions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of polishing a noble metal-containing substrate comprising the steps of:
   (a) providing a substrate, wherein the substrate comprises a noble metal selected from the group consisting of platinum, iridium, ruthenium, rhodium, palladium, silver, osmium, gold, and combinations thereof
   (b) providing a chemical-mechanical polishing composition comprising:
      (i) an abrasive comprising α-alumina,
      (ii) about 0.05 to about 50 mmol/kg of ions of at least one metal selected from the group consisting of calcium, strontium, barium, and mixtures thereof, based on the total weight of the polishing composition, and
      (iii) a liquid carrier comprising water,
   (c) applying the chemical-mechanical polishing composition to at least a portion of the substrate, and
   (d) abrading at least a portion of the noble metal of the substrate with the polishing composition to polish the substrate.

2. The method of claim 1, wherein the ions of the metal are present in the chemical-mechanical polishing composition in an amount of about 0.05 to about 10 mmol/kg.

3. The method of claim 2, wherein the ions of the metal are present in the chemical-mechanical polishing composition in an amount of about 0.05 to about 5 mmol/kg.

4. The method of claim 1, wherein the substrate comprises platinum, and at least a portion of the platinum is abraded with the polishing composition to polish the substrate.

5. The method of claim 1, wherein the abrasive further comprises fumed alumina.

6. The method of claim 5, wherein the abrasive comprises about 10 wt. % or more α-alumina.

7. The method of claim 1, wherein the abrasive is present in the polishing composition in an amount of about 0.1 to about 10 wt. % based on the total weight of the polishing composition.

8. The method of claim 7, wherein the abrasive is present in the polishing composition in an amount of about 1 to about 5 wt. % based on the total weight of the polishing composition.

9. The method of claim 1, wherein the polishing composition has a pH of about 1 to about 7.

10. The method of claim 9, wherein the polishing composition has a pH of about 2 to about 5.

11. A method of polishing a noble metal-containing substrate comprising the steps of:
  (a) providing a substrate, wherein the substrate comprises a noble metal selected from the group consisting of platinum, iridium, ruthenium, rhodium, palladium, silver, osmium, gold, and combinations thereof,
  (b) providing a chemical-mechanical polishing composition comprising:
    (i) an abrasive selected from the group consisting of α-alumina, γ-alumina, δ-alumina, θ-alumina, diamond, boron carbide, silicon carbide, tungsten carbide, titanium nitride, and mixtures thereof,
    (ii) about 0.05 to about 3.5 mmol/kg of ions of at least one metal selected from the group consisting of calcium, strontium, barium, magnesium, zinc, and mixtures thereof, based on the total weight of the polishing composition, and
    (iii) a liquid carrier comprising water,
  (c) applying the chemical-mechanical polishing composition to at least a portion of the substrate, and
  (d) abrading at least a portion of the noble metal of the substrate with the polishing composition to polish the substrate.

12. The method of claim 11, wherein the substrate comprises platinum, and at least a portion of the platinum is abraded with the polishing composition to polish the substrate.

13. The method of claim 11, wherein the abrasive further comprises fumed alumina.

14. The method of claim 13, wherein the abrasive comprises about 10 wt. % or more α-alumina.

15. The method of claim 11, wherein the abrasive is present in the polishing composition in an amount of about 0.1 to about 10 wt. % based on the total weight of the polishing composition.

16. The method of claim 15, wherein the abrasive is present in the polishing composition in an amount of about 1 to about 5 wt. % based on the total weight of the polishing composition.

17. The method of claim 11, wherein the polishing composition has a pH of about 1 to about 7.

18. The method of claim 17, wherein the polishing composition has a pH of about 2 to about 5.

* * * * *